United States Patent
Yamamoto

(10) Patent No.: US 12,130,877 B2
(45) Date of Patent: Oct. 29, 2024

(54) WEB FILTERING SYSTEM, ROUTER APPARATUS, ADMINISTRATOR TERMINAL, WEB FILTERING METHOD, AND PROGRAM

(71) Applicant: NEC Platforms, Ltd., Kawasaki (JP)

(72) Inventor: Takanori Yamamoto, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/119,661

(22) Filed: Mar. 9, 2023

(65) Prior Publication Data
US 2023/0297635 A1 Sep. 21, 2023

(30) Foreign Application Priority Data
Mar. 15, 2022 (JP) .................. 2022-039939

(51) Int. Cl.
*G06F 16/00* (2019.01)
*G06F 16/9535* (2019.01)
*H04L 67/02* (2022.01)

(52) U.S. Cl.
CPC .......... *G06F 16/9535* (2019.01); *H04L 67/02* (2013.01)

(58) Field of Classification Search
None
See application file for complete search history.

(56) References Cited

U.S. PATENT DOCUMENTS

| | | | |
|---|---|---|---|
| 9,397,978 B1* | 7/2016 | Cha | H04L 63/101 |
| 2010/0115615 A1* | 5/2010 | Hubbard | G06F 16/951 |
| | | | 707/E17.089 |

FOREIGN PATENT DOCUMENTS

| | | |
|---|---|---|
| JP | 2003-256442 A | 9/2003 |
| JP | 2013-172425 A | 9/2013 |
| JP | 2016-046625 A | 4/2016 |
| JP | 2019-032731 A | 2/2019 |
| JP | 2020-170478 A | 10/2020 |
| JP | 2021-057759 A | 4/2021 |

* cited by examiner

*Primary Examiner* — Anhtai V Tran
(74) *Attorney, Agent, or Firm* — Michael Dryja

(57) ABSTRACT

A Web filtering system includes a router apparatus, an administrator terminal, and a filtering server. The router apparatus transmits a request for a category of a Web site to the filtering server. If the router apparatus receives category information about the Web site from the filtering server, the category information indicating that category evaluation of the Web site has not been performed and the category has not been registered, the router apparatus transmits a category evaluation request packet to the administrator terminal The administrator terminal transmits a category evaluation result of the Web site to the router apparatus.

16 Claims, 20 Drawing Sheets

FIG. 3

| TERMINAL NAME | MAC ADDRESS | ADMINISTRATOR AUTHORITY |
|---|---|---|
| A1 | 00:00:00:00:00:01 | ADMINISTRATOR |
| A2 | 00:00:00:00:00:02 | ... |
| A3 | 00:00:00:00:00:03 | ... |
| ... | ... | ... |

| TERMINAL NAME | MAC ADDRESS | CATEGORY | VIEWING DETERMINATION |
|---|---|---|---|
| A2 | 00:00:00:00:00:02 | CRIMES/VIOLENCE | PROHIBITED (×) |
| | | GAMES | PROHIBITED (×) |
| | | GAMBLING | PROHIBITED (×) |
| | | DATING | PROHIBITED (×) |
| | | ADULT CONTENTS | PROHIBITED (×) |
| A3 | 00:00:00:00:00:03 | CRIMES/VIOLENCE | ALLOWED (○) |
| | | GAMES | ALLOWED (○) |
| | | GAMBLING | ALLOWED (○) |
| | | DATING | ALLOWED (○) |
| | | ADULT CONTENTS | PROHIBITED (×) |
| ⋮ | ⋮ | ⋮ | ⋮ |

| URL | CATEGORY EVALUATED |
|---|---|
| http://BBA | DATING |
| http://BBB | CRIMES/VIOLENCE |
| : | : |

| URL | REGISTERED CATEGORY |
|---|---|
| http://AAA | CRIMES/VIOLENCE |
| http://AAB | DATING |
| http://AAC | GAMBLING |
| : | : |

| URL | USER-EVALUATED CATEGORY | NUMBER OF EVALUATIONS |
|---|---|---|
| http://BBA | DATING | 7 |
| | JOB INFORMATION | 3 |
| http://BBB | CRIMES/VIOLENCE | 1 5 |
| | LIFE/LIVING | 5 |
| http://BBC | ADULT CONTENTS | 1 8 |
| ... | ... | ... |

| URL | REGISTERED CATEGORY | USER-EVALUATED CATEGORY | NUMBER OF EVALUATIONS |
|---|---|---|---|
| http://CCA | EDUCATION | CRIMES/VIOLENCE | 17 |
|  |  | EDUCATION | 3 |
| http://CCB | SHOPPING | ADULT CONTENTS | 30 |
| ⋮ | ⋮ | ⋮ | ⋮ |

42

WEB FILTERING SYSTEM, ROUTER APPARATUS, ADMINISTRATOR TERMINAL, WEB FILTERING METHOD, AND PROGRAM

REFERENCE TO RELATED APPLICATION

The present invention is based upon and claims the benefit of the priority of Japanese patent application No. 2022-039939, filed on Mar. 15, 2022, the disclosure of which is incorporated herein in its entirety by reference thereto.

FIELD

The present invention relates to a Web filtering system, a router apparatus, an administrator terminal, a Web filtering method, and a program.

BACKGROUND

In recent years, many children have come to possess mobile terminals such as mobile phones, smartphones, and tablet terminals and information communication terminals such as personal computers (PCs), and there is a problem in that the children can easily access harmful sites.

Patent Literature (PTL) 1 relates to a communication relay device capable of controlling access from communication devices to communication destinations in accordance with desired conditions set for the individual communication devices.

PTL 2 relates to a router apparatus capable of allowing an administrator terminal to grasp whether or not a non-administrator terminal is restricted to access a certain Web site.

PTL 3 relates to an information processing apparatus capable of collecting non-harmful URLs.

PTL 4 relates to a security monitoring apparatus capable of blocking harmful images and allowing a user to recognize the presence of these images that have been blocked.

PTL 5 relates to a filtering apparatus that reduces the total cost of filtering.

PTL 6 relates to a knowledge sharing system.

PTL 1: Japanese Patent Kokai Application No. 2016-046625A
PTL 2: Japanese Patent Kokai Application No. 2021-057759A
PTL 3: Japanese Patent Kokai Application No. 2020-170478A
PTL 4: Japanese Patent Kokai Application No. 2019-032731A
PTL 5: Japanese Patent Kokai Application No. 2013-172425A
PTL 6: Japanese Patent Kokai Application No. 2003-256442A

SUMMARY

The following analysis has been given by the present invention.

Even if a parent guardian sets a Web filtering function installed in a router apparatus so that a terminal of a child cannot access certain Web sites, because the number of Web sites is increasing day by day, categories of new Web sites may not be registered in a filtering system. This raises a problem in that the child cannot view these new Web sites whose categories have not yet been registered with his or her filtering target terminal until these categories are registered.

As one method for restricting access to a Web site from a mobile terminal such as a mobile phone, a smartphone, or a tablet terminal or an information communication terminal such as a personal computer (PC), there is Web filtering that prohibits access to a Web site of a certain category.

By adding a Web filtering system in a router apparatus, access to a Web site can be restricted, for each communication terminal belonging to the router apparatus.

In PTL 1, the router apparatus is provided with a Web filtering function, a fixed filter is set for each communication terminal, and restriction depending on the filter being set is applied to communication of the communication terminal.

However, the system of PTL 1 has a problem in that an administrator (for example, a parent guardian, a teacher, or the like) is uncertain about whether the setting of the Web filtering set for a terminal of a non-administrator (for example, a child, a student, or the like) in the router apparatus can appropriately restrict access to harmful sites. Because the number of Web sites is increasing day by day, and the criteria for determining whether a Web site is harmful or not differs depending on the filtering system, administrators are often concerned about whether the terminals of non-administrators are restricted to access certain Web sites by the current filtering settings set in the router apparatus.

PTL 2 provides a solution to the problem with PTL 1. The system of PTL 2 has a function to notify the administrator terminal of whether or not a non-administrator terminal is restricted to access the Web site indicated by a URL included in the HTTP request when a router apparatus receives an HTTP request from an administrator terminal.

However, the number of new Web sites and the number of Web sites whose URLs have been changed are increasing day by day. If categorizing these new Web sites cannot catch up with such increasing in a filtering server, the categories of these Web sites remain "unregistered". When the category of a Web site is "unregistered", it is not possible to view the Web site on a non-administrator terminal as a filtering target until the category of the Web site is registered. That is, there is a problem that it is not possible to view new unharmful Web sites whose categories have not yet been registered.

An object of the present invention is to provide a Web filtering system, a router apparatus, an administrator terminal, a Web filtering method, and a program that contribute to allowing to view new unharmful Web sites on a terminal(s) of a non-administrator(s) (a child or children), by appropriately evaluating categories of new Web sites by an administrator(s) (a parent guardian(s)), the categories having not yet been registered in a filtering server.

According to a first aspect of the present invention, there is provided a Web filtering system, including: a router apparatus; an administrator terminal; and a filtering server, wherein the router apparatus transmits a request for a category of a Web site to the filtering server, wherein, if the router apparatus receives category information about the Web site from the filtering server, the category information indicating that category evaluation of the Web site has not been performed and the category has not been registered, the router apparatus transmits a category evaluation request packet to the administrator terminal, and wherein the administrator terminal transmits a category evaluation result of the Web site to the router apparatus.

According to a second aspect of the present invention, there is provided a Web filtering system, including: a router apparatus; an administrator terminal; and a filtering server, wherein the router apparatus transmits a request for a category of a Web site to the filtering server, wherein, if the router apparatus receives a registered category of the Web site, a user-evaluated category(ies), and an evaluation number from the filtering server, the router apparatus transmits a viewing determination packet to the administrator terminal, and wherein the administrator terminal displays, on a screen, the registered category, the user-evaluated category(ies), and the evaluation number, displays a category evaluation request, generates a category evaluation result of the Web site in accordance with a category evaluation input, and transmits the category evaluation result of the Web site to the router apparatus.

According to a third aspect of the present invention, there is provided a router apparatus in a Web filtering system including the router apparatus, an administrator terminal, and a filtering server, wherein the router apparatus transmits a request for a category of a Web site to the filtering server, and wherein, if the router apparatus receives category information about the Web site from the filtering server, the category information indicating that category evaluation of the Web site has not been performed and the category has not been registered, the router apparatus transmits a category evaluation request packet to the administrator terminal.

According to a fourth aspect of the present invention, there is provided an administrator terminal in a Web filtering system including a router apparatus, the administrator terminal, and a filtering server, wherein the administrator terminal receives a category evaluation request packet which is transmitted from the router apparatus if the router apparatus receives, after transmitting a request for a category of a Web site to the filtering server, category information about the Web site, the category information indicating that category evaluation of the Web site has not been performed and the category has not been registered, and wherein the administrator terminal transmits a category evaluation result of the Web site to the router apparatus.

According to a fifth aspect of the present invention, there is provided a Web filtering method used in a Web filtering system including a router apparatus, an administrator terminal, and a filtering server, the Web filtering method including: transmitting a request for a category of a Web site to the filtering server by the router apparatus, transmitting a category evaluation request packet to the administrator terminal by the router apparatus if the router apparatus receives category information about the Web site from the filtering server, the category information indicating that category evaluation of the Web site has not been performed and the category has not been registered; and transmitting a category evaluation result of the Web site to the router apparatus by the administrator terminal.

According to a sixth aspect of the present invention, there is provided a program used in a Web filtering system including a router apparatus, an administrator terminal, and a filtering server, the program causing a computer of the router apparatus to perform processings to: transmit a request for a category of a Web site to the filtering server; and transmit a category evaluation request packet to the administrator terminal, if the router apparatus receives category information about the Web site from the filtering server, the category information indicating that category evaluation of the Web site has not been performed and the category has not been registered.

According to a seventh aspect of the present invention, there is provided a program used in a Web filtering system including a router apparatus, an administrator terminal, and a filtering server, the program causing a computer of the administrator terminal to perform processings to: receive a category evaluation request packet which is transmitted from the router apparatus if the router apparatus receives, after transmitting a request for a category of a Web site to the filtering server, category information about the Web site, the category information indicating that category evaluation of the Web site has not been performed and the category has not been registered, and transmit a category evaluation result of the Web site to the router apparatus.

Note that these programs can be recorded on computer-readable storage media. The storage media may be non-transient storage media such as semiconductor memories, hard disks, magnetic recording media, and optical recording media, for example. The present invention can be embodied as a computer program product.

According to the present invention, there are provided a Web filtering system, a router apparatus, an administrator terminal, a Web filtering method, and a program that contribute to allowing to view new unharmful Web sites on a terminal(s) of a non-administrator(s) (a child or children), by appropriately evaluating categories of new Web sites by an administrator(s) (a parent guardian(s)), the categories having not yet been registered in a filtering server.

BRIEF DESCRIPTION OF DRAWINGS

FIG. 3 is a diagram illustrating an example of a configuration of an administrator table according to the first example embodiment of the present invention.

FIG. 4 is a diagram illustrating an example of a configuration of a filtering rule table according to the first example embodiment of the present invention.

FIG. 5 is a diagram illustrating an example of a configuration of an evaluated category list according to the first example embodiment of the present invention.

FIG. 6 is a diagram illustrating an example of a configuration of a registered category database in a filtering server according to the first example embodiment of the present invention.

FIG. 7 is a diagram illustrating an example of a configuration of an unregistered category database in the filtering server according to the first example embodiment of the present invention.

FIG. 15 is a diagram illustrating an example of a registered category database in a filtering server according to a second example embodiment of the present invention.

EXAMPLE EMBODIMENTS

Figure 1:
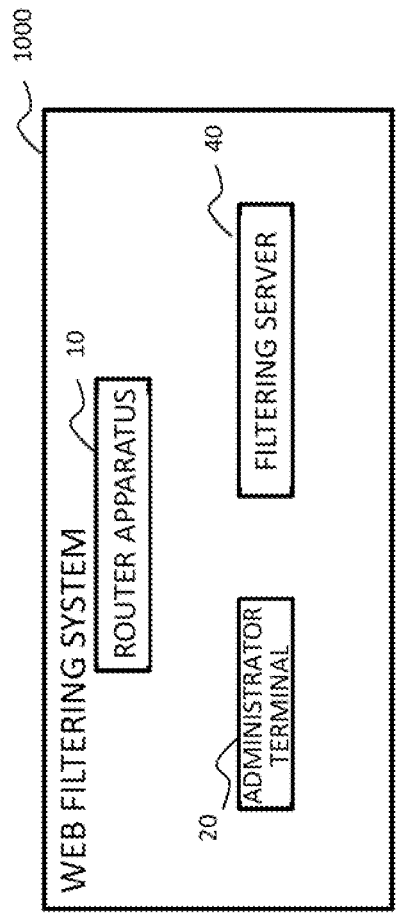
FIG. 1 is a diagram illustrating an example of a configuration of a Web filtering system according to an example embodiment of the present invention.

First, an outline of an example embodiment of the present invention will be described with reference to a drawing. Note, in the following outline, reference signs of the drawings are denoted to each element as an example for the sake of convenience to facilitate understanding and is not intended to limit the present invention to the illustrated modes. An individual connection line between blocks in the drawings, etc. referred to in the following description signifies both one-way and two-way directions. An one-way arrow schematically illustrates a principal signal (data) flow and does not exclude bidirectionality.

FIG. 1 is a diagram illustrating an example of a configuration of a Web filtering system according to an example embodiment of the present invention. With reference to FIG. 1, the Web filtering system 1000 includes a router apparatus 10, an administrator terminal 20, and a filtering server 40.

The router apparatus 10 transmits a request for a category of a Web site to the filtering server 40. If the router apparatus 10 receives category information about the Web site from the filtering server 40, the category information indicating that category evaluation of the Web site has not been performed and the category has not been registered, the router apparatus 10 transmits a category evaluation request packet to the administrator terminal 20.

The administrator terminal 20 transmits a category evaluation result of the Web site to the router apparatus 10.

According to the example embodiment of the present invention, it is possible to provide a Web filtering system that contributes to allowing to view new unharmful Web sites on a terminal(s) of a non-administrator(s) (a child or children), by appropriately evaluating categories of new Web sites by an administrator(s) (a parent guardian(s)), the categories having not yet been registered in a filtering server.

First Example Embodiment

Figure 2:
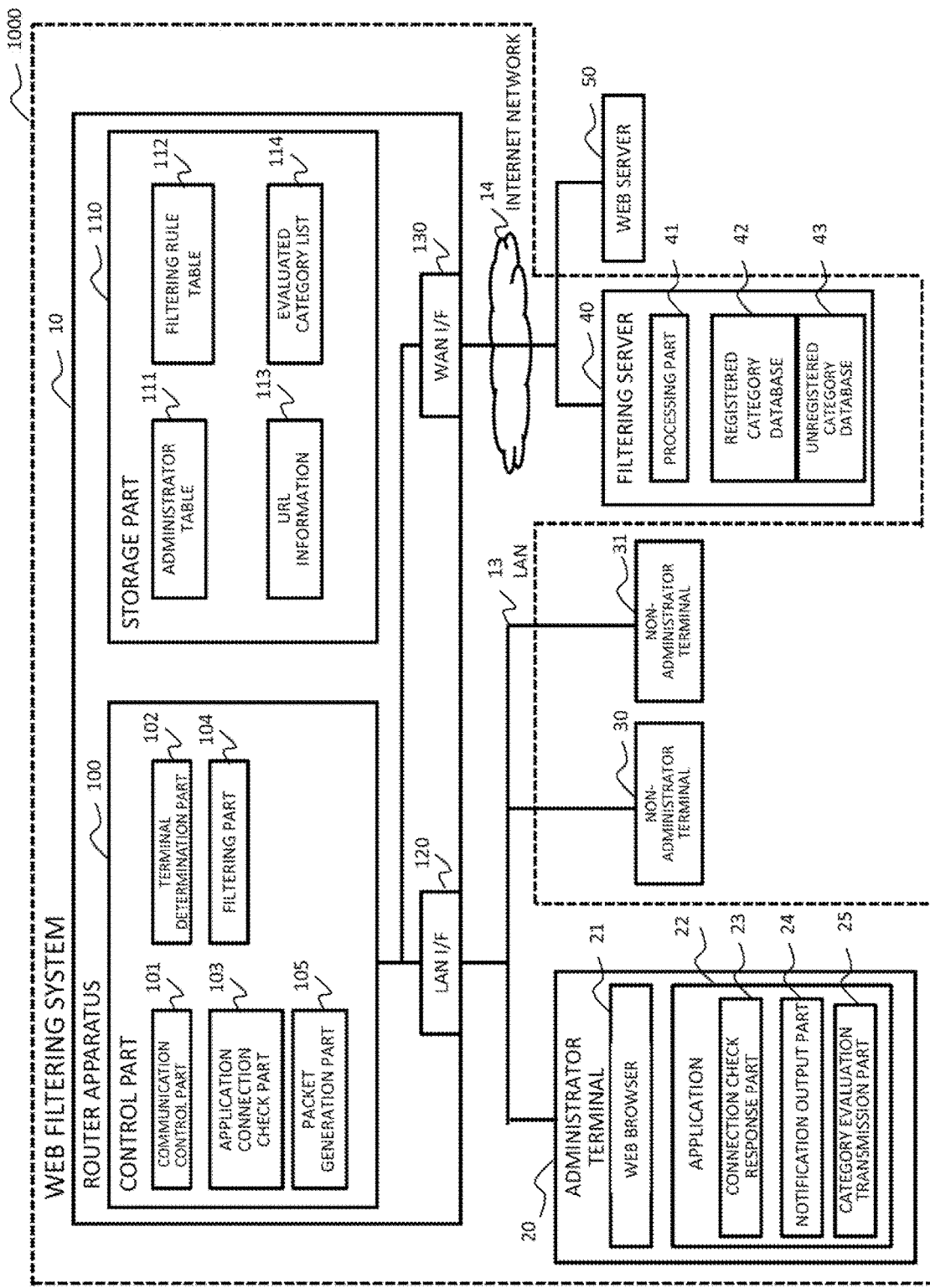
FIG. 2 is a diagram illustrating an example of a configuration of a Web filtering system according to a first example embodiment of the present invention.

Next, a Web filtering system according to a first example embodiment of the present invention will be described with reference to drawings. FIG. 2 is a diagram illustrating an example of a configuration of the Web filtering system according to the first example embodiment of the present invention. The same reference signs in FIGS. 1 and 2 denote the same constituent elements.

The configuration of the Web filtering system according to the first example embodiment of the present invention will be described with reference to FIG. 2. With reference to FIG. 2, a Web filtering system 1000 according to the first example embodiment of the present invention includes a router apparatus 10, an administrator terminal 20, and a filtering server 40. FIG. 2 illustrates the Web filtering system 1000 according to the first example embodiment of the present invention, non-administrator terminals 30 and 31, and a Web server 50.

With reference to FIG. 2, the router apparatus 10 is made up of a control part 100, a storage part 110, a LAN I/F 120, and a WAN I/F 130. LAN represents a Local Area Network, and WAN represents a Wide Area Network.

The control part 100 is made up of a communication control part 101, a terminal determination part 102, an application connection check part 103, a filtering part 104, and a packet generation part 105, and controls the entire router apparatus 10.

The communication control part 101 transmits and receives packets via the LAN I/F 120 and the WAN I/F 130.

The terminal determination part 102 refers to an administrator table 111 and determines whether a designated MAC address belongs to the administrator terminal 20.

The application connection check part 103 checks whether or not an application 22 is running on the administrator terminal 20. The application connection check part 103 generates an application connection check packet and transmits the generated application connection check packet to the administrator terminal 20 via the communication control part 101 and the LAN I/F 120. After the application connection check part 103 transmits the application connection check packet, if the application connection check part 103 receives an application connection response packet from the administrator terminal 20 via the LAN I/F 120 and the communication control part 101 within a certain period of time previously set in the router apparatus 10, the application connection check part 103 determines that the application 22 is running on the administrator terminal 20. If the application connection check part 103 does not receive the application connection response packet within the set period of time, the application connection check part 103 determines that the application 22 is not running on the administrator terminal 20.

If the category of a Web site received from the filtering server 40 is a category which has already been registered, the filtering part 104 refers to a filtering rule table 112 held in the storage part 110 and determines whether or not the Web site of the designated category can be viewed. If the category of the Web site received from the filtering server 40 is "unregistered", the filtering part 104 refers to an evaluated category list 114 and determines whether the administrator terminal 20 has already evaluated the category of the Web site. If the category of the Web site has not yet been evaluated, the filtering part 104 requests the packet generation part 105 to generate a category evaluation request packet. If the category of the Web site has already been evaluated, the filtering part 104 requests the packet generation part 105 to generate a viewing determination notification packet. In addition, when the filtering part 104 receives a category evaluation result from the administrator terminal 20, the filtering part 104 updates the evaluated category list 114. Determination of the category of the Web site is that the administrator himself or herself determines the category of the Web site accessed by the administrator terminal 20.

The packet generation part 105 generates the category evaluation request packet or the viewing determination notification packet. The category evaluation request packet is a packet which holds the URL of a Web site and information indicating that the category of the Web site is "unregistered" and requests the administrator terminal 20 to evaluate the category of the Web site. The viewing determination notification packet is a packet which holds information about the URL and category of a Web site and information indicating whether or not the non-administrator terminal 30 or 31 is allowed to view the Web site.

The storage part 110 stores various kinds of information and is made up of the administrator table 111, the filtering rule table 112, URL information 113, and the evaluated category list 114.

The administrator table 111 holds information about terminal names, MAC addresses, and administrator authority. The setting of the administrator authority is registered in advance by an individual user via a Web GUI. FIG. 3 is a diagram illustrating an example of a configuration of the administrator table 111 according to the first example embodiment of the present invention. The administrator table 111 in FIG. 3 indicates that the terminal A1 (MAC address 00:00:00:00:00:01) is an administrator terminal 20 having administrator authority. Terminals A2 and A3 are non-administrator terminals 30 and 31 because no administrator authority is associated with these terminals A2 and A3.

FIG. 4 is a diagram illustrating an example of a configuration of the filtering rule table 112 according to the first example embodiment of the present invention. The filtering rule table 112 holds information about the terminal names and MAC addresses of the non-administrator terminals 30 and 31, categories, and whether or not each category can be viewed on the non-administrator terminals 30 and 31. The category list in the filtering rule table 112 is associated with a category list in the filtering server 40. The present example embodiment assumes that the filtering rule table 112 is set in advance by the user who owns the administrator terminal 20, that is, the administrator, via the Web GUI. The filtering rule table 112 in FIG. 4 indicates that it is prohibited to view Web sites that fall under the categories of "crimes/violence", "games", "gambling", "dating", and "adult contents" on the non-administrator terminal 30, which is the terminal A2. In addition, it is prohibited to view Web sites that fall under the category of "adult contents" on the non-administrator terminal 31, which is a terminal A3.

The URL information 113 holds information about the URL of a Web site obtained from an HTTP request received from the administrator terminal 20. When the packet generation part 105 generates the category evaluation request packet or the viewing determination notification packet, the packet generation part 105 acquires the URL of the corresponding Web site from the URL information 113 and, at the same time, clears the URL information 113.

FIG. 5 is a diagram illustrating an example of a configuration of the evaluated category list 114 according to the first example embodiment of the present invention. For a Web site which has not yet been registered in the filtering server 40, the evaluated category list 114 includes the URL of the Web site and information about the category evaluated by the administrator having the administrator terminal 20. The evaluated category list 114 in FIG. 5 indicates that the administrator having the administrator terminal 20 has determined that the Web site of http://BBA falls under the category of "dating". A Web site whose URL is not included in the evaluated category list 114 is a Web site that has not yet been evaluated by the administrator having the administrator terminal 20.

The LAN I/F 120 is an interface for connection to a LAN. The LAN I/F 120 communicates with the administrator terminal 20 and the non-administrator terminal 30 or 31 via a LAN 13.

The WAN I/F 130 is an interface for connection to an Internet network 14. The WAN I/F 130 communicates with the filtering server 40 and the Web server 50 via a WAN (the Internet network 14).

The administrator terminal 20 is a terminal of an administrator of the Web filtering function included in the router apparatus 10. The administrator terminal 20 includes a Web browser 21 and the application 22. The Web browser 21 is common software for browsing Web pages published on the Internet. The application 22 is an application dedicated to the Web filtering system according to the present invention. It is assumed that the application 22 is installed in the administrator terminal 20 in advance.

The application 22 of the administrator terminal 20 includes a connection check response part 23, a notification output part 24, and a category evaluation transmission part 25.

When the application 22 is running on the administrator terminal 20, if the administrator terminal 20 receives an application connection check packet from the router apparatus 10, the connection check response part 23 transmits an application connection response packet.

When the notification output part 24 receives a category evaluation request packet from the router apparatus 10, the notification output part 24 outputs a screen of a category evaluation request on the screen of the administrator terminal 20. When the notification output part 24 receives a viewing determination notification packet, the notification output part 24 outputs a screen of a viewing determination notification on the screen of the administrator terminal 20.

When the administrator evaluates the category of the Web site on the screen of the category evaluation request outputted on the screen of the administrator terminal 20, the category evaluation transmission part 25 transmits a category evaluation result, that is, the information about the Web site category selected by the administrator and the URL of the Web site to the router apparatus 10.

The non-administrator terminals 30 and 31 are terminals owned by users who are not administrators of the Web filtering function included in the router apparatus 10.

The filtering server 40 includes URL databases in which URLs included in HTTP requests are stored in association with categories of the Web sites identified by the URLs. When the filtering server 40 receives an inquiry about a category of a Web site from the router apparatus 10, the filtering server 40 refers to these URL databases, checks the category to which a specified URL belongs, and transmits information about the category of the identified URL to the router apparatus 10. The filtering server 40 includes a processing part 41 and a registered category database 42 and an unregistered category database 43, which are the URL databases.

The processing part 41 performs processing for checking a URL received from the router apparatus 10 against the registered category database 42 or the unregistered category database 43. Next, the processing part 41 transmits information about the category obtained from the registered category database 42 or the unregistered category database 43 to the router apparatus 10.

FIG. 6 is a diagram illustrating an example of a configuration of the registered category database 42 in the filtering server 40 according to the first example embodiment of the present invention. The registered category database 42 is a database of Web sites categorized by the filtering service provider that owns the filtering server 40. The registered category database 42 includes information about the URLs and categories of these Web sites. FIG. 6 illustrates that the Web site of http://AAA is designated to the category of "crimes/violence". A Web site that is not included in this registered category database 42 is a Web site that has not yet been categorized.

FIG. 7 is a diagram illustrating an example of a configuration of the unregistered category database 43 in the filtering server 40 according to the first example embodiment of the present invention. The unregistered category database 43 is a database in which results of category evaluations performed on Web sites that are not registered in the registered category database 42 by administrators having their respective administrator terminals 20 are aggregated. The unregistered category database 43 includes information about the URLs of these Web sites, the categories evaluated by the users, and the number of evaluators of the categories. With reference to FIG. 7, it is illustrated that, among 10 administrators who have evaluated the category of the Web site of http://BBA, seven administrators have determined that the Web site falls under the category of "dating", and three administrators have determined that the Web site falls under the category of "job information". A Web site that is registered in neither the registered category database 42 nor the unregistered category database 43 is a Web site whose category has not yet been evaluated by any administrators. If a certain number of evaluations on a Web site performed by administrators having their respective administrator terminals 20 have been collected, this Web site may be automatically reflected in the registered category database 42.

When the Web server 50 receives an HTTP request from the router apparatus 10, the Web server 50 transmits an HTTP response to the router apparatus 10 in response to the HTTP request.

Next, a Web filtering operation performed by the Web filtering system 1000 according to the first example embodiment of the present invention will be described.

FIGS. 8 to 12 are drawings each illustrating an example of a flowchart illustrating a flow of an operation of the Web filtering.

Figure 8:
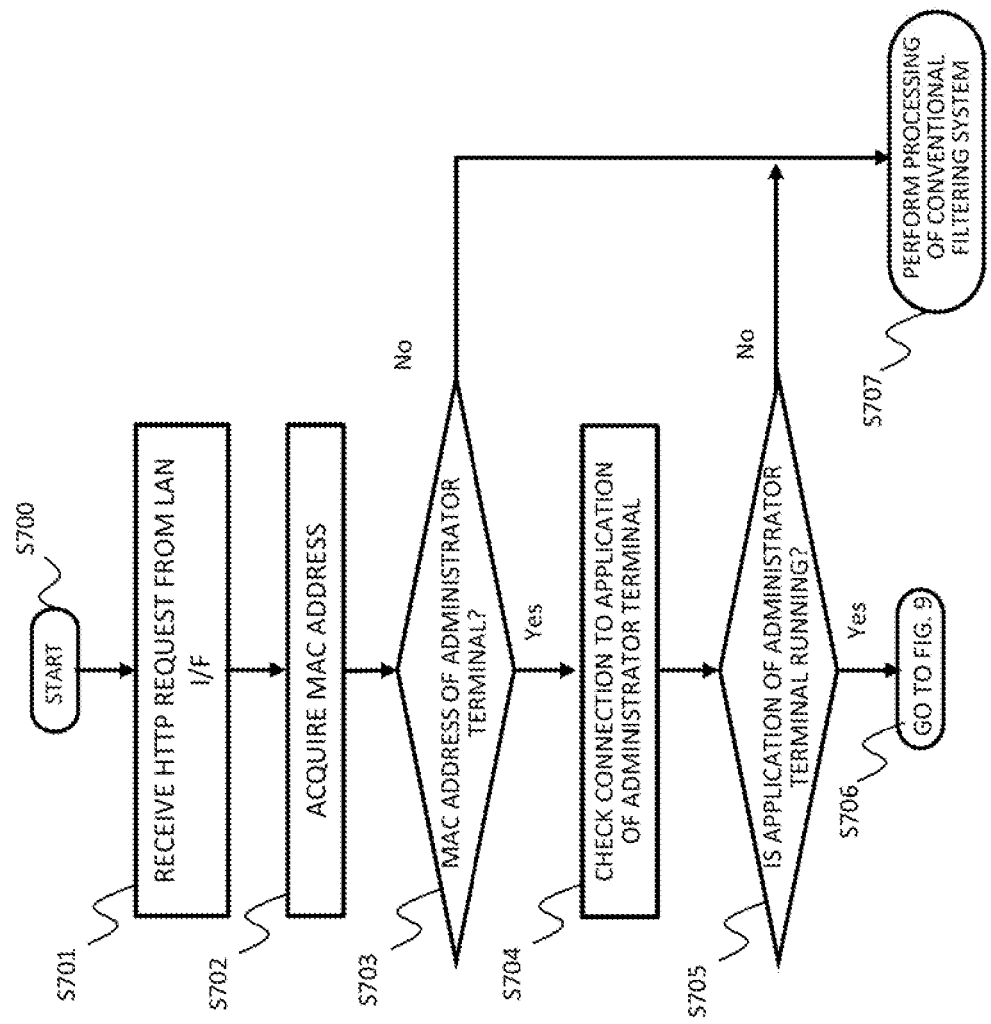
FIG. 8 is a diagram illustrating an example of a flowchart of processing from reception of an HTTP request to checking of running of an application in a router apparatus according to the first example embodiment of the present invention.

FIG. 8 is a diagram illustrating an example of a flowchart of processing from reception of an HTTP request to checking of running of an application in the router apparatus according to the first example embodiment of the present invention. A flow of the processing from reception of an HTTP request to checking of running of the application 22 in the router apparatus 10 will be described with reference to FIG. 8.

First, the non-administrator terminal 30 or 31, which is a filtering target, attempts to access a Web site A whose category is "unregistered" in the filtering server 40 and fails to view the Web site A because the category is "unregistered". In this case, the non-administrator terminal 30 or 31 notifies the application 22 installed in the administrator terminal 20 that the access to the Web site A has been blocked.

Thus, to check the content of the Web site A, the administrator having the administrator terminal 20 accesses the Web site A.

When the administrator terminal 20 accesses the Web site A on the Web browser, the administrator terminal 20 transmits an HTTP request for the Web site A to the router apparatus 10.

When the communication control part 101 receives the HTTP request for the Web site A via the LAN I/F 120 (step S701), the communication control part 101 acquires a transmission source MAC address from a packet of an HTTP request (step S702) and transmits the acquired transmission source MAC address to the terminal determination part 102.

The terminal determination part 102 refers to the administrator table 111 in the storage part 110 and determines whether or not the MAC address received from the communication control part 101 is the MAC address of the administrator terminal 20 (step S703). If the received MAC address is the MAC address of the administrator terminal 20, the processing proceeds to processing for the administrator terminal in the Web filtering system according to the present invention (step S703: Yes). If the received MAC address is not the MAC address of the administrator terminal 20 but the MAC address of the non-administrator terminal 30 or 31 (step S703: No), the processing proceeds to processing of a conventional Web filtering system (step S707). Because the flow of the processing of a conventional Web filtering system is known, description thereof will be omitted.

If the received MAC address is the MAC address of the administrator terminal 20 (step S703: Yes), the terminal determination part 102 notifies the communication control part 101 that the received MAC address is the MAC address of the administrator terminal 20.

When receiving the notification indicating that the received MAC address is the MAC address of the administrator terminal 20, the communication control part 101 requests the application connection check part 103 to generate an application connection check packet.

Next, the application connection check part 103 generates an application connection check packet and transmits the generated application connection check packet to the administrator terminal 20 via the communication control part 101 and the LAN I/F 120 (step S704). If the application connection check part 103 receives an application connection response packet from the administrator terminal 20 via the LAN I/F 120 and the communication control part 101 within a set period of time after transmitting the application connection check packet, the application connection check part 103 determines that the application 22 is running on the administrator terminal 20 (step S705: Yes) and notifies the communication control part 101 that the application 22 in the administrator terminal 20 is running. If the application connection check part 103 does not receive the application connection response packet within the set period of time, the application connection check part 103 determines that the application 22 is not running on the administrator terminal 20 (step S705: No), and the processing proceeds to processing of the conventional Web filtering system (step S707).

Figure 9:
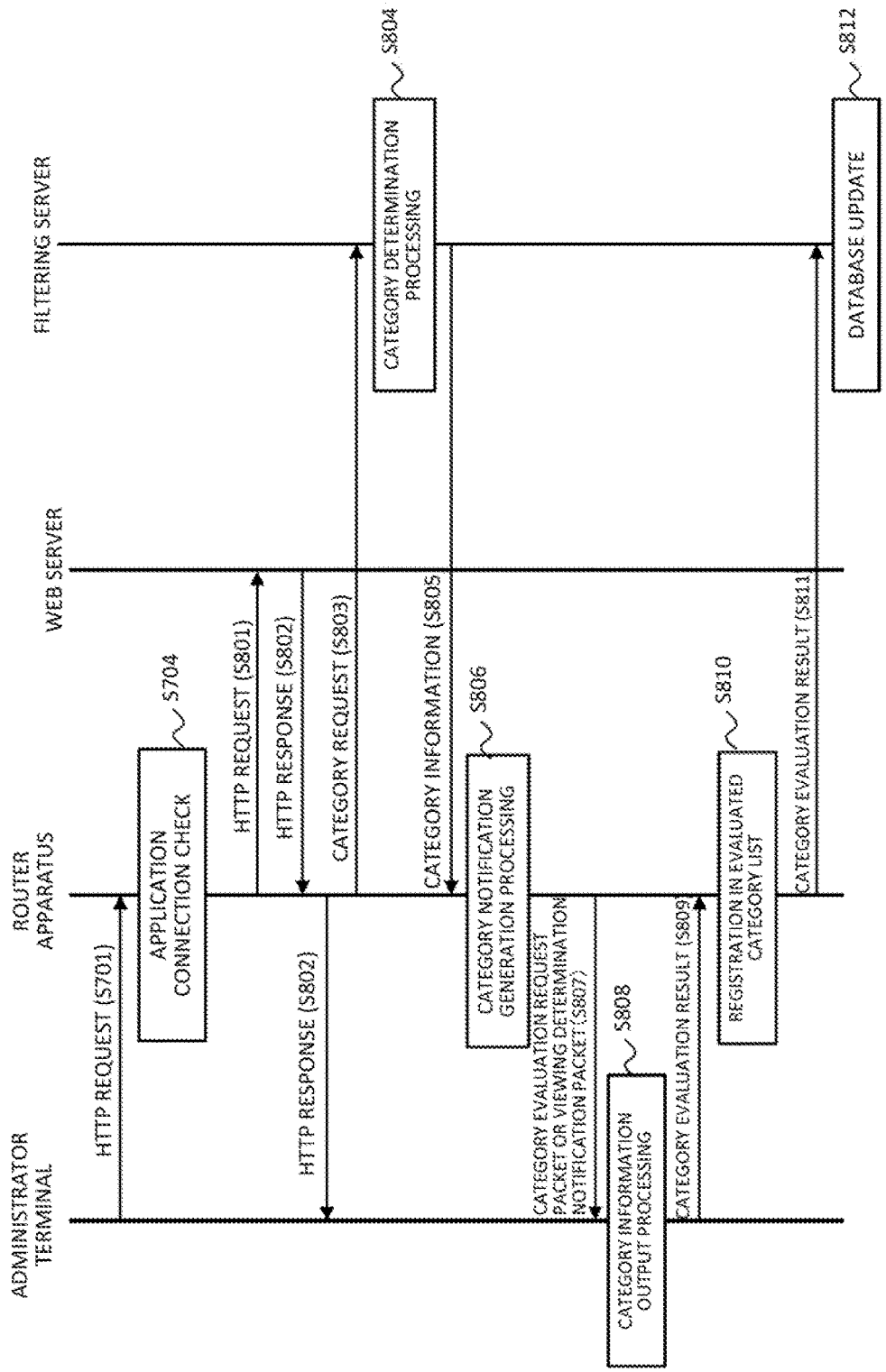
FIG. 9 is a diagram illustrating an example of a flow of processing performed by the Web filtering system for an administrator terminal according to the first example embodiment of the present invention.

Next, a flow of processing performed by the Web filtering system 1000 for the administrator terminal will be described with reference to FIG. 9. FIG. 9 is a diagram illustrating an example of a flow of processing performed by the Web filtering system 1000 for the administrator terminal according to the first example embodiment of the present invention.

With reference to FIG. 9, when the communication control part 101 in the router apparatus 10 receives a notification indicating that the application 22 in the administrator terminal 20 is running from the application connection check part 103, the communication control part 101 reads URL information about the Web site A from the HTTP request and stores the read URL information in the URL information 113 in the storage part 110. Next, the communication control part 101 transmits an HTTP request for the Web site A to the Web server 50 via the WAN I/F 130 (step S801). When the communication control part 101 receives an HTTP response in response to the HTTP request from the Web server 50, the communication control part 101 transmits this HTTP response to the administrator terminal 20 (step S802). As a result, the Web site A can be viewed on the Web browser 21 by the administrator terminal 20 which has received the HTTP response.

Next, the communication control part 101 refers to the URL information 113 in the storage part 110, acquires the URL of the Web site A, and transmits a category request to the filtering server 40 via the WAN I/F 130 to inquire about the category of the Web site A (step S803). Upon receiving the URL of the Web site A, the filtering server 40 performs category determination processing (step S804).

Figure 10:
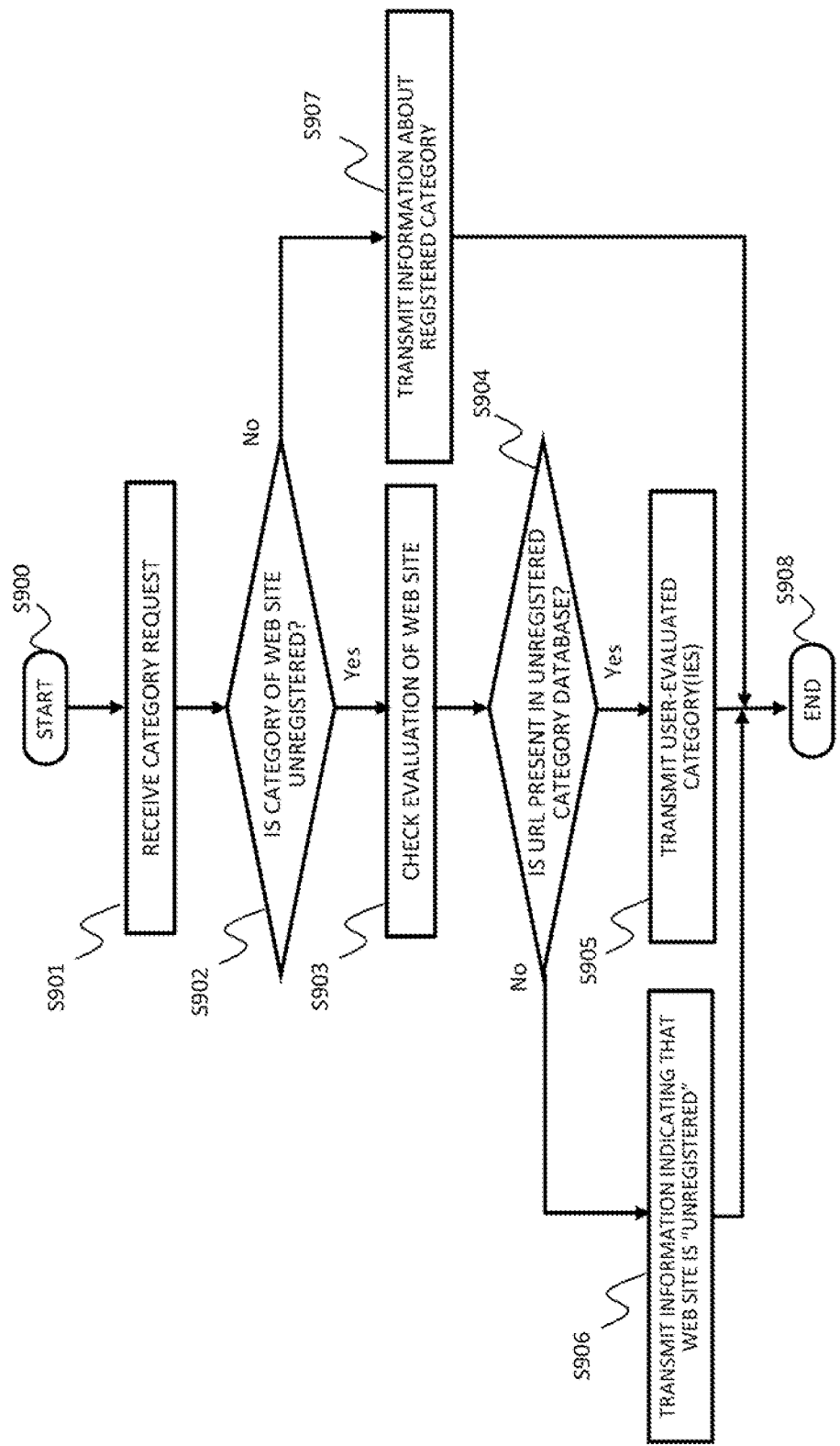
FIG. 10 is a diagram illustrating an example of a flowchart of processing that the filter server performs after receiving a category request according to the first example embodiment of the present invention.

A flow of the category determination processing (step S804) that the filtering server 40 performs after receiving the URL of the Web site A will be described with reference to FIG. 10. FIG. 10 is a diagram illustrating an example of a flowchart of the processing that the filtering server 40 performs after receiving the category request according to the first example embodiment of the present invention. The processing starts at step S900.

Upon receiving the URL of the Web site A and the request for the category of the Web site A (step S901), the processing part 41 in the filtering server 40 checks the URL of the Web site A against the registered category database 42. If the URL of the Web site A is not present in the registered category database 42, that is, if the category of the Web site A is unregistered (step S902: Yes), the processing part 41 then checks the URL of the Web site A against the unregistered category database 43 and checks the evaluation of the Web site A (step S903). If the URL of the Web site A is present in the unregistered category database 43 (step S904: Yes), the processing part 41 transmits information about a user-evaluated category(ies) and the number of evaluations corresponding to the URL and information indicating that the Web site A is "unregistered" to the router apparatus 10 (step S905). If the URL of the Web site A is not included in the unregistered category database 43 (step S904: No), the processing part 41 transmits only the information indicating that the Web site A is "unregistered" to the router apparatus 10 (step S906).

If the URL of the Web site A is included in the registered category database 42, that is, if the category of the Web site A has been registered (step S902: No), the processing part 41 transmits information about the registered category of the Web site A to the router apparatus 10 (step S907). The processing ends at step S908.

Referring back to FIG. 9, when the category information about the Web site A is transmitted from the filtering server 40 to the communication control part 101 in the router apparatus 10 (step S805), the communication control part 101 transmits the category information about the Web site A to the filtering part 104. Next, the filtering part 104 performs category notification generation processing (step S806).

Figure 11:
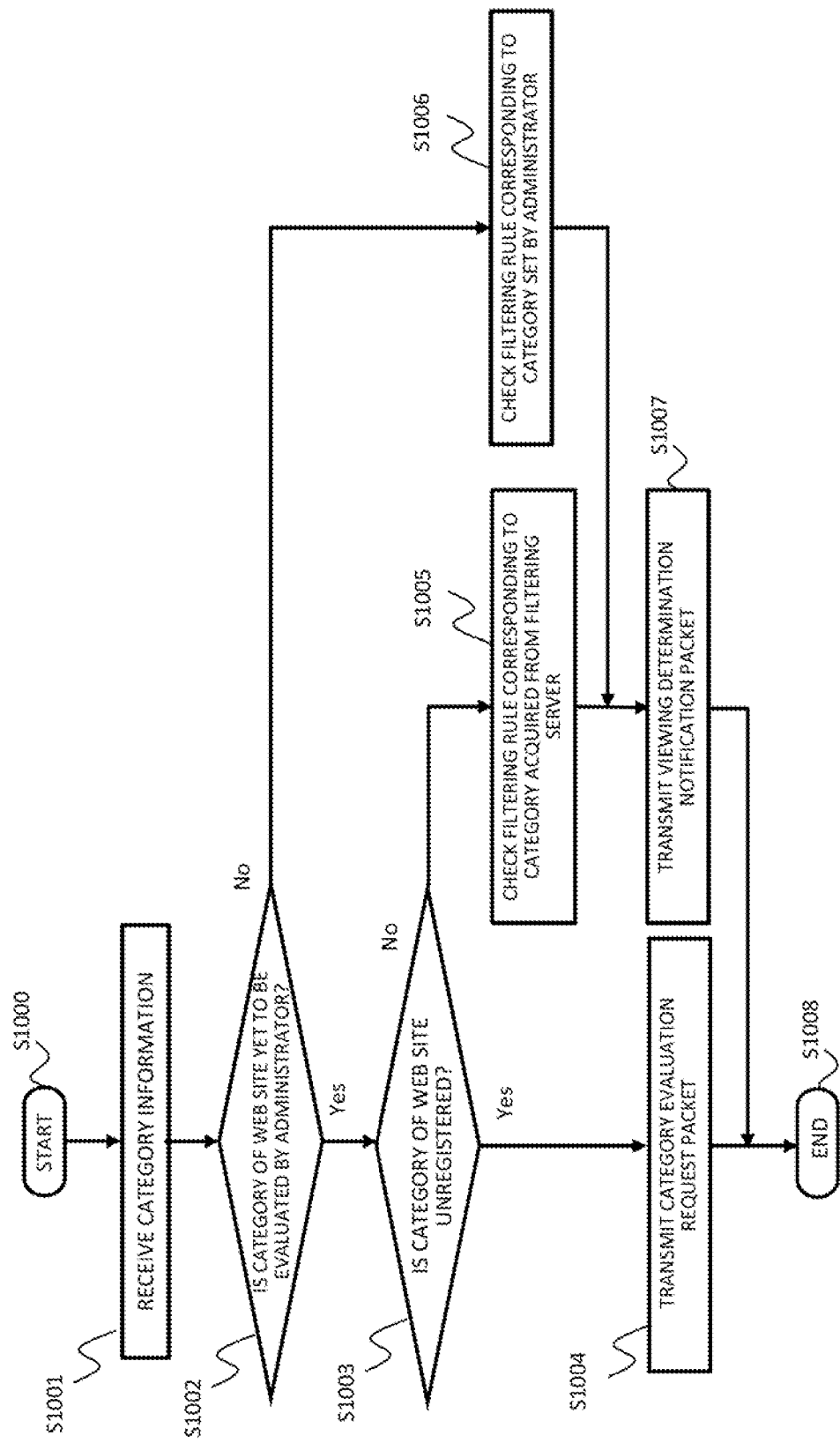
FIG. 11 is a diagram illustrating an example of a flowchart of category notification generation processing performed by the router apparatus according to the first example embodiment of the present invention.

A flow of the category notification generation processing (step S806 in FIG. 9) performed by the router apparatus 10 will be described with reference to FIG. 11. FIG. 11 is a diagram illustrating an example of a flowchart of the category notification generation processing performed by the router apparatus 10 according to the first example embodiment of the present invention. The processing starts at step S1000.

The filtering part 104 receives the category information about the Web site A (step S1001) and analyzes the category information. First, the filtering part 104 acquires the URL of the Web site A from the URL information 113 and checks the URL against the evaluated category list 114 (step S1002). If the URL of the Web site A is absent in the evaluated category list 114, that is, if the category of the Web site A is yet to be evaluated by the administrator having the administrator terminal 20 (step S1002: Yes), the filtering part 104 checks the category information about the Web site A received from the filtering server 40. If the category of the Web site A is "unregistered" in the registered category database 42 in the filtering server 40 (step S1003: Yes), the filtering part 104 transmits information about the user-evaluated category(ies) and the number of evaluations for the Web site A acquired from the filtering server 40 and information indicating that the Web site A is "unregistered" to the packet generation part 105 and requests the packet generation part 105 to generate a category evaluation request packet to be transmitted to the administrator terminal 20. If the filtering part 104 has not received the information about the user-evaluated category(ies) and the number of evaluations for the Web site A, the filtering part 104 transmits only information indicating that the Web site A is "unregistered" to the packet generation part 105.

Upon receiving the request, the packet generation part 105 acquires the URL of the Web site A from the URL information 113 in the storage part 110 and clears the URL information 113. Next, the packet generation part 105 generates a category evaluation request packet from the URL of the Web site A and the category information about the Web site A acquired from the filtering server 40 and passes the generated category evaluation request packet to the communication control part 101. The communication control part 101 transmits the category evaluation request packet to the administrator terminal 20 via the LAN I/F 120 (step S1004).

If the category of the Web site A has already been registered in the registered category database 42 in the filtering server 40 (step S1003: No), the viewing determination notification packet is generated by using the category acquired from the filtering server 40. The filtering part 104 refers to the filtering rule table 112 and checks the category setting state of the Web site A for each of the non-administrator terminals 30 and 31, the category setting state having been acquired from the filtering server 40. That is, the filtering part 104 checks the filtering rule corresponding to the acquired category (step S1005), transmits the category setting to the packet generation part 105, and requests the packet generation part 105 to generate a viewing determination notification packet to be transmitted to the administrator terminal 20.

If the URL of the Web site A is present in the evaluated category list 114, that is, if the Web site A has already been evaluated by the administrator terminal 20 (step S1002: No), the viewing determination notification packet is generated by using the category of the Web site A evaluated by the administrator terminal 20, the category being registered in the evaluated category list 114. The filtering part 104 refers to the filtering rule table 112 and checks the category setting state of the Web site A for each of the non-administrator terminals 30 and 31, the category setting state being registered in the evaluated category list 114. That is, the filtering part 104 checks the filtering rule corresponding to the category set by the administrator (step S1006), transmits the setting to the packet generation part 105, and requests the packet generation part 105 to generate a viewing determination notification packet to be transmitted to the administrator terminal 20.

Upon receiving the request to generate the viewing determination notification packet, the packet generation part 105 acquires the URL of the Web site A from the URL information 113 in the storage part 110 and clears the URL information 113. Next, the packet generation part 105 generates the viewing determination notification packet from the URL of the Web site A and the information about the category setting of the Web site A for each of the non-administrator terminals 30 and 31, the category setting having been received from the filtering part 104. The packet generation part 105 transmits the generated viewing determination notification packet to the communication control part 101 and requests the communication control part 101 to transmit a viewing determination notification to the administrator terminal 20.

Upon receiving the viewing determination notification packet from the packet generation part 105, the communication control part 101 transmits a viewing determination notification to the administrator terminal 20 via the LAN I/F 120 (step S1007). The processing ends at step S1008.

Figure 12:
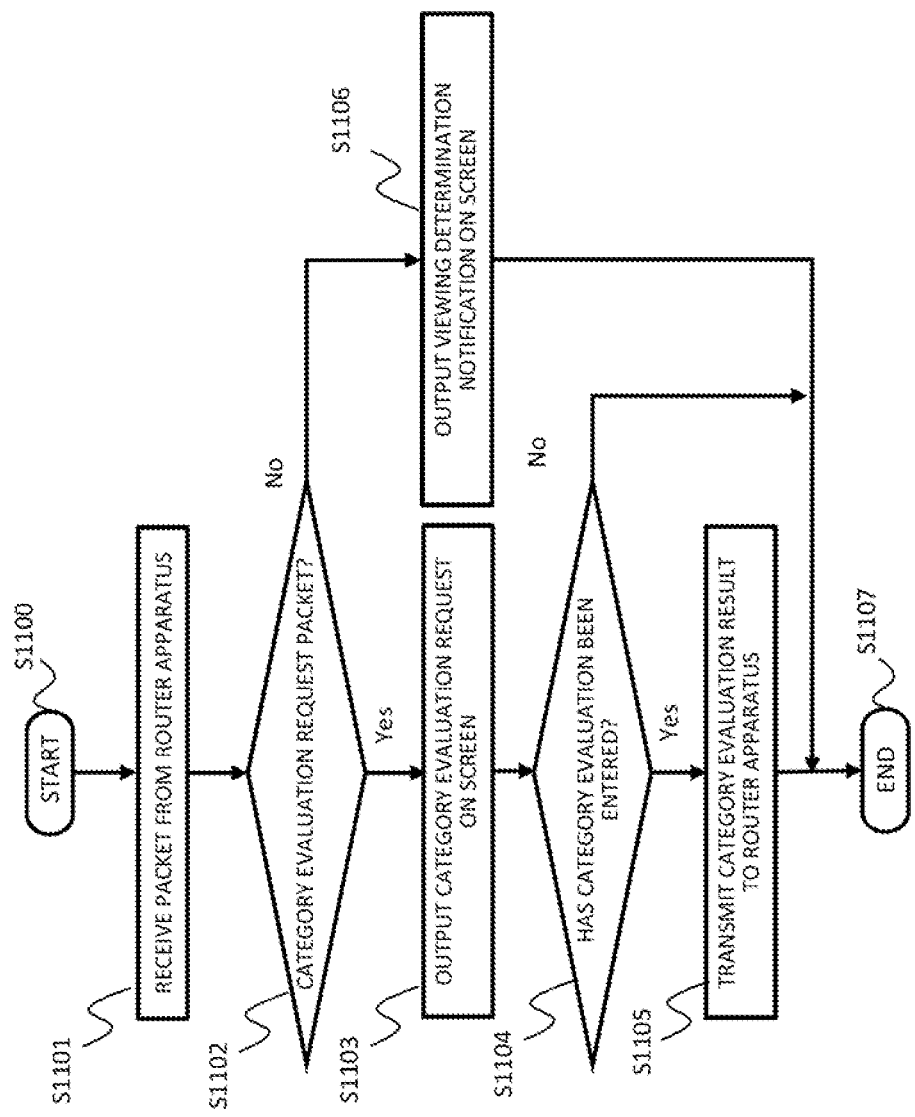
FIG. 12 is a diagram illustrating an example of a flowchart of processing that the administrator terminal performs after receiving a packet according to the first example embodiment of the present invention.

Next, a flow of processing (step S808 in FIG. 9) that the administrator terminal 20 performs after receiving the category evaluation request packet or the viewing determination notification packet will be described with reference to FIG. 12. FIG. 12 is a diagram illustrating an example of a flowchart of processing that the administrator terminal 20 performs after receiving a packet according to the first example embodiment of the present invention. The processing starts at step S1100.

When the notification output part 24 in the administrator terminal 20 receives a packet from the router apparatus 10 (step S1101), the notification output part 24 determines whether the packet is the category evaluation request packet or the viewing determination notification packet (step S1102). If the packet is the category evaluation request packet (step S1102: Yes), the notification output part 24 outputs a category evaluation request on the screen of the administrator terminal 20 (step S1103).

Figure 13:
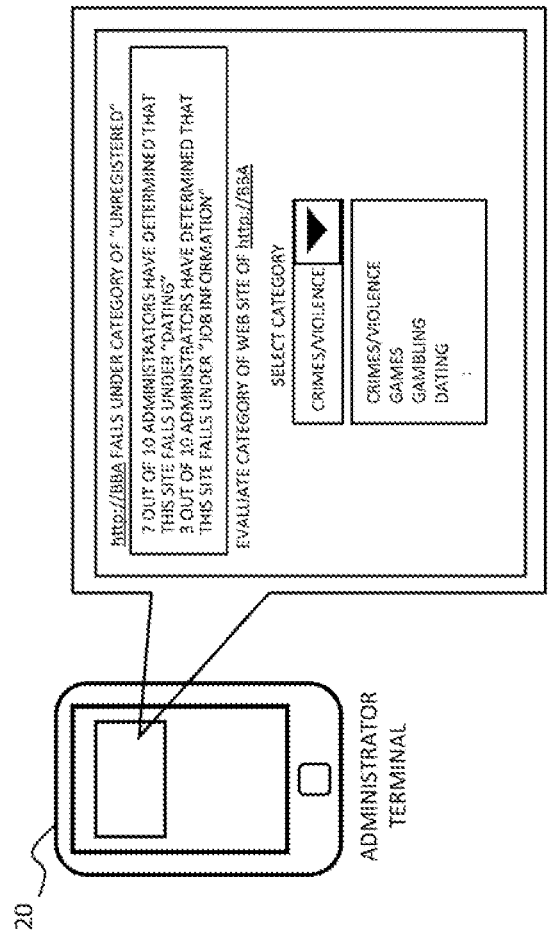
FIG. 13 is a diagram illustrating an example of a category evaluation request outputted on a screen of the administrator terminal according to the first example embodiment of the present invention.

FIG. 13 is a diagram illustrating an example of a category evaluation request outputted on the screen of the administrator terminal 20 according to the first example embodiment of the present invention. The category evaluation request is used to request the administrator having the administrator terminal 20 to evaluate the category of the Web site A when the registration category of the Web site A is not registered in the registered category database 42 in the filtering server 40. The administrator terminal 20 in which the application 22 is installed can display the category evaluation request on its screen. The category of the Web site of http://BBA accessed by the administrator terminal 20 is indicated as "unregistered" on the screen of the administrator terminal 20. When the user-evaluated category of the Web site of http://BBA and the corresponding number of evaluations are registered in the unregistered category database 43 in the filtering server 40, information about the category selected by the administrators who has performed the evaluation is displayed. When there are a plurality of user-evaluated categories of the Web site of http://BBA, all the information may be outputted or only some of the upper categories may be displayed. A form for selecting a category from a list of categories is provided on the output screen so that the administrator can select the category of the Web site of http://BBA opened by the administrator having the administrator terminal 20.

After the category evaluation request is outputted on the screen of the administrator terminal 20, if the category of the Web site A is evaluated by the operation of the administrator on the screen (step S1104: Yes), the selected category and the URL of the Web site A are transmitted to the category evaluation transmission part 25, and transmission of the category evaluation result is requested. Upon receiving the request, the category evaluation transmission part 25 transmits the category evaluation result, that is, the category of the Web site A selected by the administrator, and the URL of the Web site A to the router apparatus 10 (step S1105).

After the category evaluation request is outputted on the screen of the administrator terminal 20, if the category of the Web site A is not evaluated by the administrator within a certain period of time (step S1104: No), the administrator terminal 20 ends the processing without performing any processing.

If the packet received from the router apparatus 10 is the viewing determination notification packet (step S1102: No), a viewing determination notification is outputted on the screen of the administrator terminal 20 (step S1106). The processing ends at step S1107.

Figure 14:
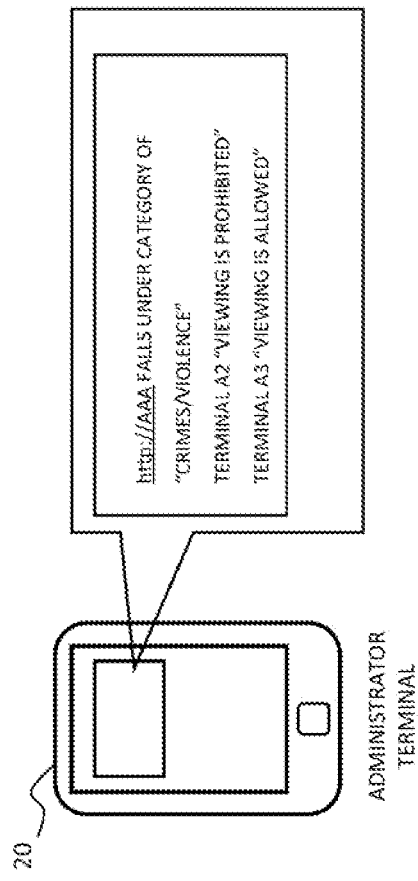
FIG. 14 is a diagram illustrating an example of a viewing determination notification outputted on the screen of the administrator terminal according to the first example embodiment of the present invention.

FIG. 14 is a diagram illustrating an example of the viewing determination notification outputted on the screen of the administrator terminal 20 according to the first example embodiment of the present invention. The viewing determination notification is for notifying information indicating whether the Web site A can be viewed by the non-administrator terminal 30 or 31 that is registered in the filtering rule table 112. Because the application 22 is installed in the administrator terminal 20, the viewing determination notification can be outputted and displayed on the screen of the administrator terminal 20. With reference to FIG. 14, the screen of the administrator terminal 20 indicates that the Web site of http://AAA accessed by the administrator terminal 20 falls under the category of "crimes/violence". In addition, the screen of the administrator terminal 20 indicates that it is "prohibited" to view the Web site on the non-administrator terminal A2 and that it is "allowed" to view the Web site on the non-administrator terminal A3.

Referring back to FIG. 9, when the administrator terminal 20 transmits the category evaluation result to the communication control part 101 in the router apparatus 10 (step S809), the communication control part 101 transmits the category evaluation result to the filtering part 104 and the filtering server 40.

Upon receiving the category evaluation result, the filtering part 104 registers the URL of the Web site A and the category evaluated by the administrator in the evaluated category list 114 (step S810). Thereafter, when a terminal that belongs to the router apparatus 10 accesses the Web site A, filtering is performed based on the category registered in the evaluated category list 114.

Next, upon receiving the category evaluation result (step S811), the filtering server 40 updates the unregistered category database 43 (step S812).

As described above, even when the category of a Web site is not registered in the filtering server 40, the administrator having the administrator terminal 20 can evaluate the category in consideration of the evaluation results of other administrators, and thereafter, the Web site is filtered based on the category selected by the administrator. As a result, it becomes possible to view new unharmful Web sites on the non-administrator terminal 30 or 31 even when the categories of these Web sites have not yet been registered in the filtering server.

According to the first example embodiment of the present invention, even when the categories of Web sites have not been registered in the filtering server 40, since the administrator having the administrator terminal 20 evaluates the categories of the Web sites, it becomes possible to view new unharmful Web sites on the non-administrator terminals 30 and 31.

In addition, when the administrator evaluates the category of a Web site, the administrator can grasp the results of the category evaluations performed on the same Web site by other administrators, and the administrator can appropriately set the category in view of such information.

Further, because only the administrator(s) is allowed to perform the category evaluation, the user(s) of the non-administrator terminal(s) is prevented from viewing new harmful sites.

As described above, according to the first example embodiment of the present invention, there is provided a Web filtering system that contributes to allowing to view new unharmful Web sites on a terminal(s) of a non-administrator(s) (a child or children), by appropriately evaluating categories of new Web sites by an administrator(s) (a parent guardian(s)), the categories having not yet been registered in a filtering server.

Second Example Embodiment

Next, a Web filtering system 1000 according to a second example embodiment of the present invention will be described with reference to drawings. The following description will be made assuming that an example of a configuration of the Web filtering system 1000 according to the second example embodiment of the present invention is the same as the example of the configuration of the Web filtering system 1000 according to the first example embodiment of the present invention illustrated in FIG. 2.

In the first example embodiment of the present invention, the administrator having the administrator terminal 20 performs the category evaluation on new Web sites whose categories have not yet been registered in the filtering server 40. However, there are cases where Web sites whose categories have already been registered in the filtering server 40 may include a Web site that used to be a good Web site but has become a harmful site after a change of the content of the Web site. In this case, the latest content of the Web site does not match the corresponding category registered in the filtering server 40, and such site may be viewed on the non-administrator terminal 30 or 31.

The second example embodiment of the present invention realizes ways for evaluating the category of the Web site A based on a determination made by the administrator having the administrator terminal 20 even when the category of the Web site A has already been registered in the filtering server 40.

FIG. 15 is a diagram illustrating an example of a registered category database 42 in the filtering server 40 according to the second example embodiment of the present invention. First, the registered category database 42 in the filtering server 40 according to the second example embodiment will be described with reference to FIG. 15. Two columns, which are a user-evaluated category and the number of evaluations, are added to the registered category database 42, and the registered category database 42 holds results of the evaluations performed by using the administrator terminal(s) 20 within the latest set period of time. The latest set period of time may be the last one month or half a year. With reference to FIG. 15, it is illustrated that, while the filtering service provider sets the category of the Web site of http://CCA as "education", 17 out of 20 administrators having their respective administrator terminals 20 have determined that the category of the Web site falls under "crimes/violence".

Since the general flow of the processing of the Web filtering system for an administrator terminal according to the second example embodiment of the present invention is the same as the example of the flow of the processing of the Web filtering system for an administrator terminal according to the first example embodiment of the present invention illustrated in FIG. 9, what is different between the processing according to the second example embodiment of the present invention and the processing according to the first example embodiment of the present invention will be described with reference to FIG. 9.

A flow of processing from reception of an HTTP request to checking of running of the application 22, the processing being performed by the router apparatus 10, is the same as the example of the flowchart of the processing from reception of an HTTP request to checking of running of the application performed by the router apparatus according to the first example embodiment of the present invention illustrated in FIG. 8. Therefore, description thereof will be omitted.

Figure 16:
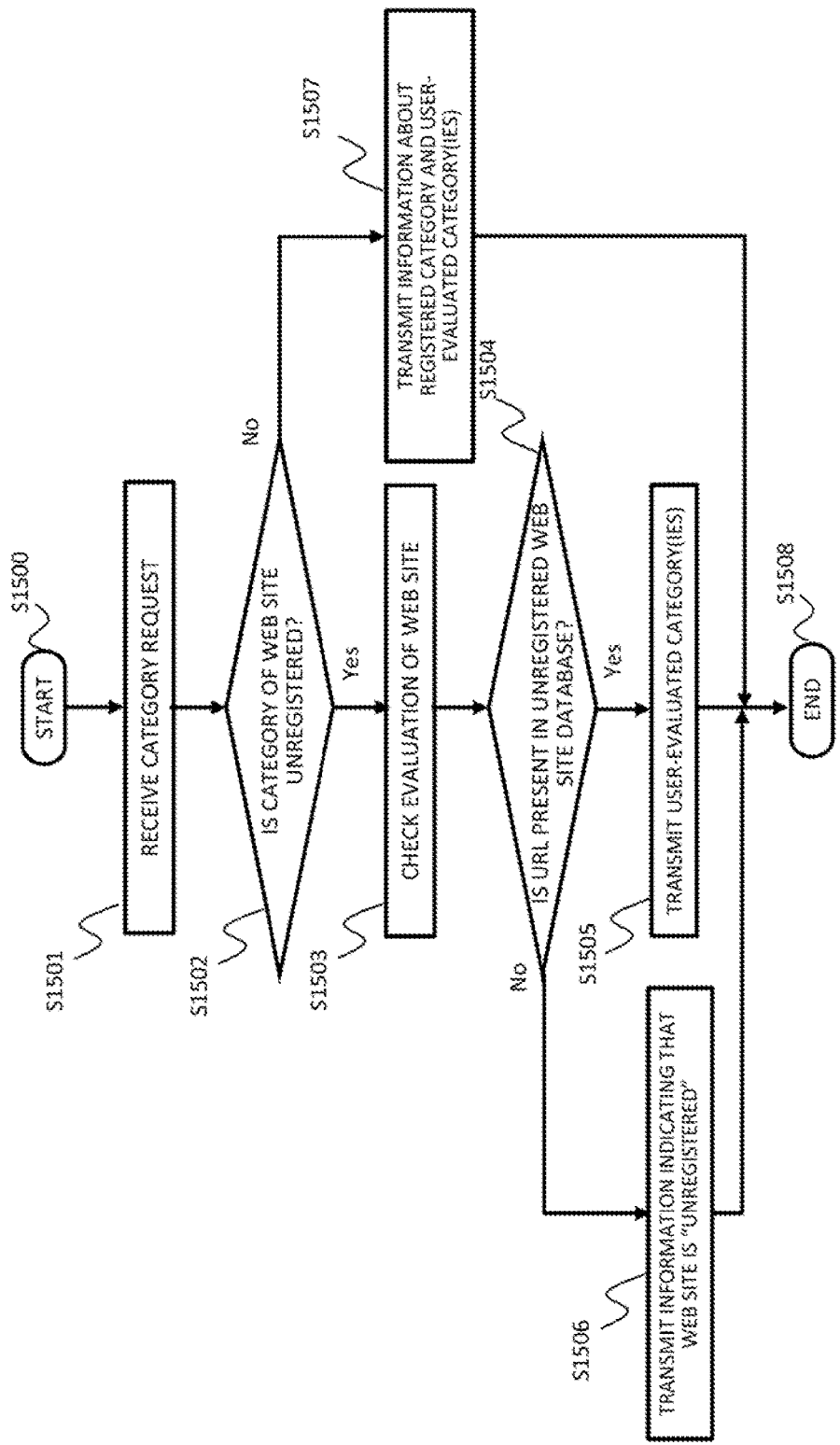
FIG. 16 is a diagram illustrating an example of a flowchart of processing that the filtering server performs after receiving a category request according to the second example embodiment of the present invention.

FIG. 16 is a diagram illustrating an example of a flowchart of processing that the filtering server 40 performs after receiving a category request according to the second example embodiment of the present invention. A flow of the category determination processing (step S804 in FIG. 9) that the filtering server 40 according to the second example embodiment performs after receiving the URL of the Web site A will be described with reference to FIG. 16. The processing starts at step S1500.

In FIG. 16, the processing (from step S1501 to step S1506) performed when the URL of the Web site A is not registered in the registered category database 42 in the filtering server 40 is the same as the processing as described from step S901 to step S906 that the filtering server according to the first example embodiment of the present invention performs after receiving the category request illustrated in FIG. 10. Therefore, description thereof will be omitted.

With reference to FIG. 16, if the URL of the Web site A is present in the registered category database 42, that is, if the category of the Web site A has already been registered (step S1502: No), the processing part 41 transmits the registered category of the Web site A, the user-evaluated category, and the number of evaluations to the router apparatus 10 (step S1507). Absence of a user-evaluated category and the number of evaluations denotes that no evaluations have been performed by any administrators having their respective administrator terminals 20. Thus, only the information about the registered category of the Web site A is transmitted to the router apparatus 10. The processing ends at step S1508.

Next, in a flow of category notification generation processing performed by the router apparatus 10 according to the second example embodiment of the present invention (step S806 in FIG. 9), processing different from that according to the first example embodiment of the present invention will be described.

In transmission processing of a viewing determination notification packet in the category notification generation processing performed by the router apparatus according to the second example embodiment of the present invention, the transmission processing corresponding to the transmission processing of the viewing determination notification packet (step S1007) in the category notification generation processing performed by the router apparatus according to the first example embodiment of the present invention illustrated in FIG. 11, upon receiving a request for transmission of the viewing determination notification packet, the packet generation part 105 acquires the URL of the Web site A from the URL information 113 in the storage part 110 and clears the URL information 113. Next, the packet generation part 105 generates the viewing determination notification packet from the URL of the Web site A, the category information about the Web site A acquired from the filtering server 40, that is, the registered category of the Web site A, the user-evaluated category(ies), and the number of evaluations and transmits the viewing determination notification packet to the communication control part 101. The communication control part 101 transmits the received viewing determination notification packet to the administrator terminal 20 via the LAN I/F 120.

Figure 17:
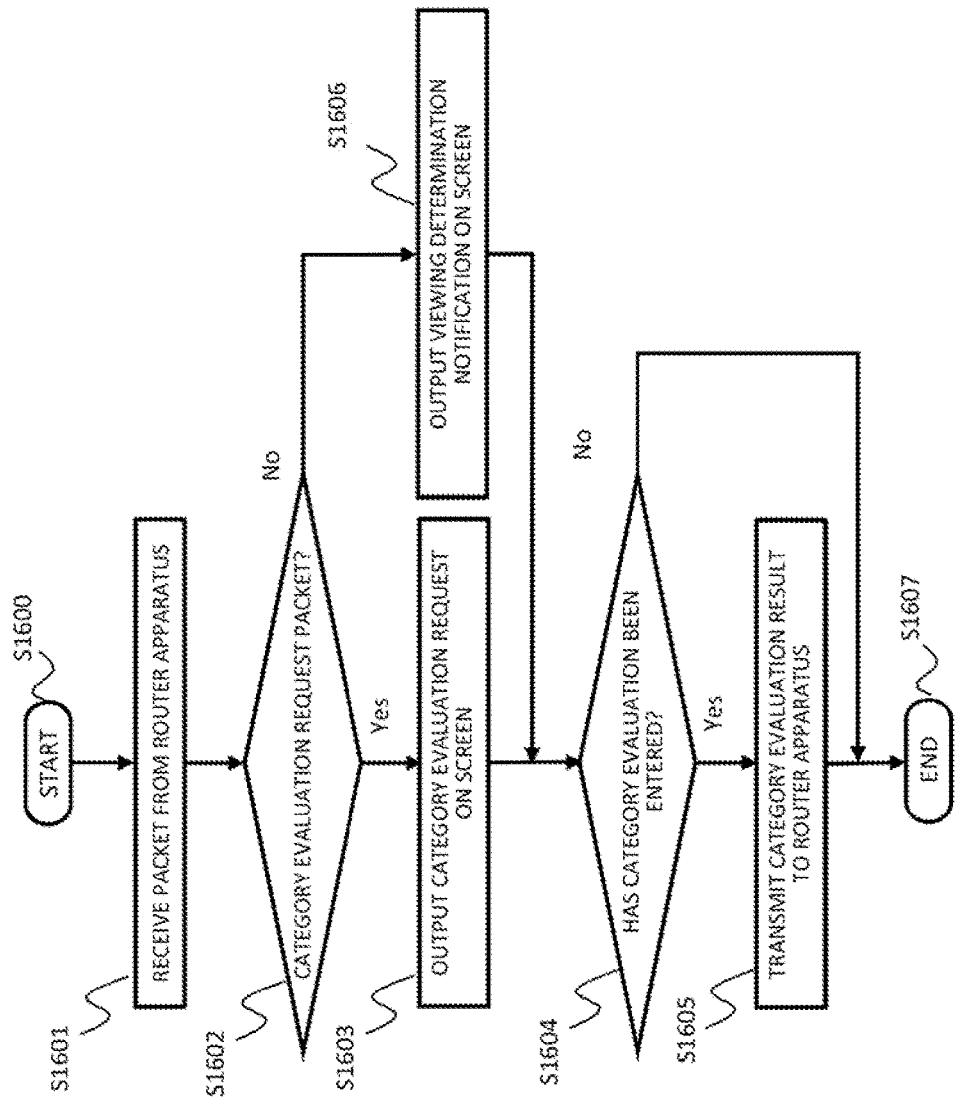
FIG. 17 is a diagram illustrating an example of a flowchart of processing that an administrator terminal performs after receiving a packet according to the second example embodiment of the present invention.

FIG. 17 is a diagram illustrating an example of a flowchart of processing that an administrator terminal performs after receiving a packet according to the second example embodiment of the present invention. A flow of processing (step S808 in FIG. 9) performed when the administrator terminal 20 receives the category evaluation request packet or the viewing determination notification packet according to the second example embodiment of the present invention will be described with reference to FIG. 17. The processing starts at step S1600.

The processing performed when the administrator terminal 20 receives the category evaluation request packet (from step S1601 to step S1605) is the same as the processing from step S1101 to step S1105 illustrated in FIG. 12. Therefore, description thereof is omitted.

If the packet received from the router apparatus 10 is the viewing determination notification packet (step S1602: No), a viewing determination notification is outputted on the screen of the administrator terminal 20 (step S1606). Finally, the processing ends at step S1607.

Figure 18:
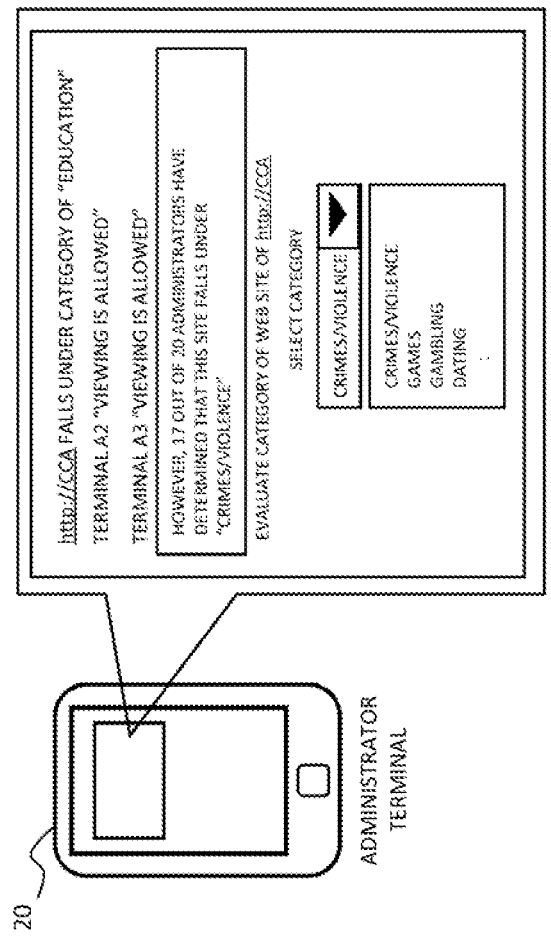
FIG. 18 is a diagram illustrating an example of a viewing determination notification screen on the administrator terminal according to the second example embodiment of the present invention.

FIG. 18 is a diagram illustrating an example of a viewing determination notification screen on the administrator terminal according to the second example embodiment of the present invention. A viewing determination notification outputted on the screen of the administrator terminal 20 according to the second example embodiment of the present invention will be described with reference to FIG. 18. In the first example embodiment of the present invention, the viewing determination notification only displays whether it is allowed or prohibited to view the Web site A on the non-administrator terminal 30 or 31. However, as is the case with the category evaluation request packet, the viewing determination notification allows the administrator to evaluate the category of the Web site A. In FIG. 18, the screen of the administrator terminal 20 indicates that the Web site of http://CCA accessed by the administrator terminal 20 is registered as the category of "education" in the filtering server 40 and that it is allowed to view the Web site on the non-administrator terminals A2 and A3.

In addition, on the screen of the viewing determination notification, information about the categories selected by the administrators who have performed their category evaluations on the Web site of http://CCA within the latest set period of time is displayed. In FIG. 18, 17 out of 20 administrators who have performed their category evaluations have determined that the Web site falls under the category of "crimes/violence", which is different from the category of "education" registered in the filtering server 40. Thus, information indicating that "However, 17 out of 20 administrators have determined that the site falls under "crimes/violence"" is displayed. Further, a form in which a category can be selected from a list of categories is provided on the output screen. This allows the administrator having the administrator terminal 20 to select the category of the Web site of http://CCA opened on the administrator terminal 20. That is, the administrator can evaluate the category of the Web site of http://CCA.

The processing (step S810 in FIG. 9) performed by the router apparatus 10 when the router apparatus 10 receives a category evaluation result from the administrator terminal 20 (step S809 in FIG. 9) is the same as the processing according to the first example embodiment of the present invention. Therefore, description thereof is omitted.

Figure 19:
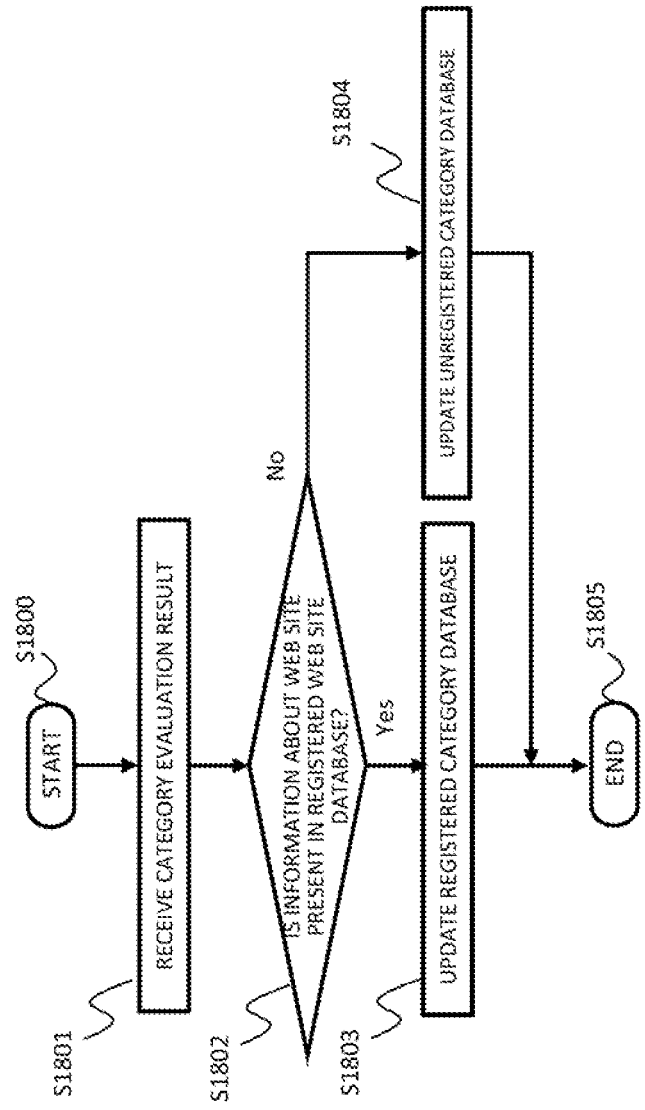
FIG. 19 is a diagram illustrating an example of a flowchart of processing that the filtering server performs after receiving a category evaluation according to the second example embodiment of the present invention.

FIG. 19 is a diagram illustrating an example of a flowchart of processing that the filtering server 40 performs after receiving a category evaluation according to the second example embodiment of the present invention. The processing performed when the filtering server 40 receives a category evaluation result from the router apparatus 10 (step S812 in FIG. 9) will be described with reference to FIG. 19. The processing starts at step S1800.

When the filtering server 40 receives a category evaluation result, that is, when the filtering server 40 receives the category of the Web site A selected by the administrator and the URL of the Web site A (step S1801), the processing part 41 checks the URL of the Web site A against the registered category database 42. That is, the processing part 41 checks whether the information about the Web site A is present in the registered category database 42 (step S1802). If the URL of the Web site A is included in the registered category database 42 (step S1802: Yes), the registered category database 42 is updated (step S1803).

If the URL of the Web site A is not included in the registered category database 42 (step S1802: No), the unregistered category database 43 is updated (step S1804). The processing ends at step S1805.

According to the Web filtering system according to the second example embodiment of the present invention, as described above, even when the category of the Web site A is registered in the filtering server 40, the category of the Web site A can be evaluated based on the determination of the administrator having the administrator terminal 20.

While the individual example embodiments of the present invention have thus been described, the present invention is not limited thereto. Further variations, substitutions, or adjustments can be made without departing from the basic technical concept of the present invention. For example, the configurations of the networks, the configurations of the elements, and the representation modes of the messages illustrated in the drawings have been used only as examples to facilitate understanding of the present invention. That is, the present invention is not limited to the configurations illustrated in the drawings. In addition, in the following description, "A and/or B" signifies at least one of A and B.

The procedures described in the above first and second example embodiments can each be realized by a program that causes a computer (9000 in FIG. 20) functioning as the router apparatus or the administrator terminal according to the present invention to realize the function as a corresponding one of the Web filtering system, the router apparatus, and the administrator terminal. This computer is illustrated by a configuration including a CPU (Central Processing Unit)

Figure 20:
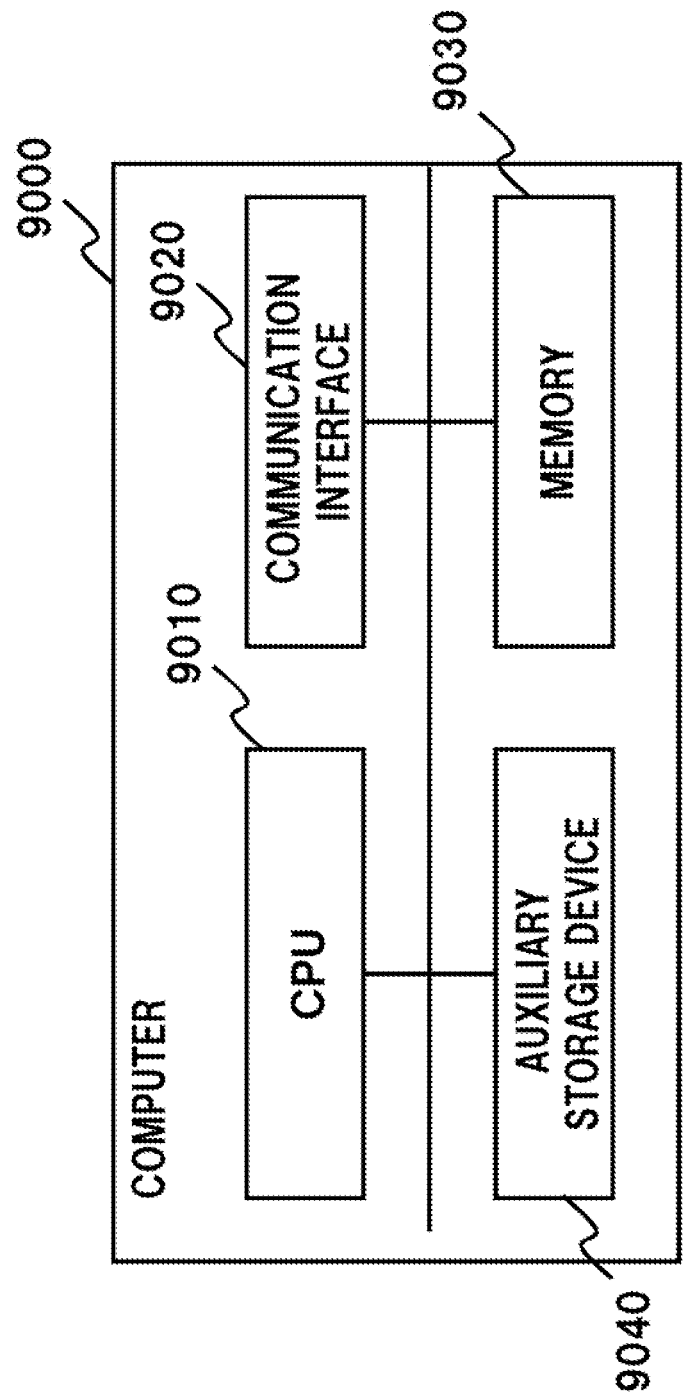
FIG. 20 is a diagram illustrating a configuration of a computer making up any one of the systems, the router apparatuses, and the administrator terminals according to the present invention.

9010, a communication interface 9020, a memory 9030, and an auxiliary storage device 9040 in FIG. 20, for example. That is, any one of the procedures can be realized by causing the CPU 9010 in FIG. 20 to execute a corresponding control program of the Web filtering system and to perform processing for updating individual computation parameters held in the auxiliary storage device 9040, for example.

The memory 9030 is, for example, a RAM (Random Access Memory) or a ROM (Read-Only Memory), and so on.

That is, each of the individual parts and sections (processing means, functions) of the router apparatus and the administrator terminal according to the above first and second example embodiments can be realized by a computer program that causes a processor in the corresponding computer described above to use its hardware and to execute the corresponding processing as described above.

Finally, suitable modes of the present invention will be summarized.

Mode 1

(See the Web filtering system according to the above first aspect)

Mode 2

In the Web filtering system according to mode 1, it is preferable that, if the administrator terminal receives a category evaluation request packet, the administrator terminal display a category evaluation request on a screen and generate a category evaluation result of the Web site in accordance with a category evaluation input, and that the displayed category evaluation request include an evaluation result(s) of a different administrator(s).

Mode 3

In the Web filtering system according to mode 1 or 2, it is preferable that the router apparatus transmit the category evaluation result of the Web site received from the administrator terminal to the filtering server.

Mode 4

In the Web filtering system according to mode 3, it is preferable that the filtering server update a database in accordance with the category evaluation result of the Web site.

Mode 5

(See the Web filtering system according to the above second aspect)

A Web filtering system, comprising:

a router apparatus;

an administrator terminal; and a filtering server, wherein the router apparatus transmits a request for a category of a Web site to the filtering server, wherein, if the router apparatus receives a registered category of the Web site, a user-evaluated category(ies), and an evaluation number from the filtering server, the router apparatus transmits a viewing determination packet to the administrator terminal, and wherein the administrator terminal displays, on a screen, the registered category, the user-evaluated category(ies), and the evaluation number, displays a category evaluation request, generates a category evaluation result of the Web site in accordance with a category evaluation input, and transmits the category evaluation result of the Web site to the router apparatus.

Mode 6

(See the router apparatus according to the above third aspect)

A router apparatus in a Web filtering system including the router apparatus, an administrator terminal, and a filtering server, wherein the router apparatus transmits a request for a category of a Web site to the filtering server, and wherein, if the router apparatus receives category information about the Web site from the filtering server, the category information indicating that category evaluation of the Web site has not been performed and the category has not been registered, the router apparatus transmits a category evaluation request packet to the administrator terminal.

Mode 7

(See the administrator terminal according to the above fourth aspect)

An administrator terminal in a Web filtering system including a router apparatus, the administrator terminal, and a filtering server, wherein the administrator terminal receives a category evaluation request packet which is transmitted from the router apparatus if the router apparatus receives, after transmitting a request for a category of a Web site to the filtering server, category information about the Web site, the category information indicating that category evaluation of the Web site has not been performed and the category has not been registered, and wherein the administrator terminal transmits a category evaluation result of the Web site to the router apparatus.

Mode 8

(See the Web filtering method according to the above fifth aspect)

Mode 9

(See the program according to the above sixth aspect)

Mode 10

(See the program according to the above seventh aspect)

A program used in a Web filtering system including a router apparatus, an administrator terminal, and a filtering server, the program causing a computer of the administrator terminal to perform processings to:

receive a category evaluation request packet which is transmitted from the router apparatus if the router apparatus receives, after transmitting a request for a category of a Web site to the filtering server, category information about the Web site, the category information indicating that category evaluation of the Web site has not been performed and the category has not been registered, and transmit a category evaluation result of the Web site to the router apparatus.

The above modes 5 to 10 can be expanded in the same way as mode 1 is expanded to modes 2 to 4.

The disclosure of each of the above PTLs, etc. is incorporated herein by reference thereto. Modifications and adjustments of the example embodiments or examples are possible within the scope of the overall disclosure (including the claims) of the present invention and based on the basic technical concept of the present invention. Various combinations or selections of various disclosed elements (including the elements in each of the claims, example embodiments, examples, drawings, etc.) are possible within the scope of the disclosure of the present invention. That is, the present invention of course includes various variations and modifications that could be made by those skilled in the art according to the overall disclosure including the claims and the technical concept. Especially, as to numerical value ranges disclosed in the present specification, even if the specification does not particularly disclose numerical values or small ranges included in the ranges, these values and ranges should be deemed to have been concretely disclosed.

REFERENCE SIGNS LIST 10 router apparatus
13 LAN
14 Internet network
20 administrator terminal
21 Web browser
22 application
23 connection check response part
24 notification output part
25 category evaluation transmission part
30, 31 non-administrator terminal
40 filtering server
41 processing part
42 registered category database
43 unregistered category database
50 Web server
100 control part
101 communication control part
102 terminal determination part
103 application connection check part
104 filtering part
105 packet generation part
110 storage part
111 administrator table
112 filtering rule table
113 URL information
114 evaluated category list
120 LAN I/F
130 WAN I/F
1000 Web filtering system
9000 computer
9010 CPU
9020 communication interface
9030 memory
9040 auxiliary storage device

What is claimed is:

1. A Web filtering system comprising:
a router apparatus comprising hardware including a memory storing instructions and at least one processor configured to execute the instructions;
an administrator terminal comprising hardware including a memory storing instructions and at least one processor configured to execute the instructions; and
a filtering server comprising hardware including a memory storing instructions and at least one processor configured to execute the instructions,
wherein the router apparatus transmits a request for a category of a Web site to the filtering server,
wherein, when the router apparatus receives category information about the Web site from the filtering server, the category information indicating that category evaluation of the Web site has not been performed and the category has not been registered, the router apparatus transmits a category evaluation request packet to the administrator terminal,
wherein, when the administrator terminal receives the category evaluation request packet, the administrator terminal displays a category evaluation request on a screen and generates a category evaluation result of the Web site in accordance with a category evaluation input, and
wherein the displayed category evaluation request includes at least one evaluation result of at least one different administrator, and
wherein the administrator terminal transmits the category evaluation result of the Web site to the router apparatus.

2. The Web filtering system according to claim 1, wherein the router apparatus transmits the category evaluation result of the Web site received from the administrator terminal to the filtering server.

3. The Web filtering system according to claim 2, wherein the filtering server updates a database in accordance with the category evaluation result of the Web site.

4. The Web filtering system according to claim 1, wherein the router apparatus registers the category evaluation result of the Web site in an evaluated category list.

5. The Web filtering system according to claim 1, wherein the router apparatus performs filtering based on the category evaluation result of the Web site registered in the evaluated category list.

6. The Web filtering system according to claim 5, wherein the router apparatus performs filtering based on the category evaluation result of the Web site and information about categories and whether or not each category can be viewed as held in a filtering rule table.

7. A Web filtering method used in a Web filtering system including a router apparatus, an administrator terminal, and a filtering server, the Web filtering method comprising:
transmitting a request for a category of a Web site to the filtering server by the router apparatus,
transmitting a category evaluation request packet to the administrator terminal by the router apparatus when the router apparatus receives category information about the Web site from the filtering server, the category information indicating that category evaluation of the Web site has not been performed and the category has not been registered;
displaying a category evaluation request on a screen and generating a category evaluation result of the Web site in accordance with a category evaluation input by the administrator terminal when the administrator terminal receives a category evaluation request packet,
wherein the displayed category evaluation request includes at least one evaluation result of at least one different administrator; and
transmitting the category evaluation result of the Web site to the router apparatus by the administrator terminal.

8. The Web filtering method according to claim 7, further comprising:
transmitting, by the router apparatus, the category evaluation result of the Web site received from the administrator terminal to the filtering server.

9. The Web filtering method according to claim 8, further comprising:
updating a database in accordance with the category evaluation result of the Web site by the filtering server.

10. The Web filtering method according to claim 7, further comprising:
registering the category evaluation result of the Web site in an evaluated category list by the router apparatus.

11. The Web filtering method according to claim 7, further comprising:
performing filtering based on the category evaluation result of the Web site registered in the evaluated category list by the router apparatus.

12. The Web filtering method according to claim 11,
wherein the filtering is performed based on the category evaluation result of the Web site and information about categories and whether or not each category can be viewed as held in a filtering rule table by the router apparatus.

13. A non-transitory computer-readable non-transient recording medium recording storing a program to perform processing, the program used in a Web filtering system including a router apparatus, an administrator terminal, and a filtering server, the program causing a computer of the router apparatus, the processing comprising:

transmitting a request for a category of a Web site to the filtering server;

transmitting a category evaluation request packet to the administrator terminal, when the router apparatus receives category information about the Web site from the filtering server, the category information indicating that category evaluation of the Web site has not been performed and the category has not been registered;

displaying a category evaluation request on a screen and generating a category evaluation result of the Web site in accordance with a category evaluation input by the administrator terminal when the administrator terminal receives a category evaluation request packet, wherein the displayed category evaluation request includes at least one evaluation result of at least one different administrator; and transmitting the category evaluation result of the Web site received from the administrator terminal to the filtering server.

14. The medium according to claim 13, wherein the processing further comprises:

registering the category evaluation result of the Web site in an evaluated category list.

15. The medium according to claim 13, wherein the processing further comprises: further causing the computer of the router apparatus to perform processing to:

performing filtering based on the category evaluation result of the Web site registered in the evaluated category list by the router apparatus.

16. The medium according to claim 15, wherein the filtering is performed based on the category evaluation result of the Web site and information about categories and whether or not each category can be viewed as held in a filtering rule table.

* * * * *